(12) United States Patent
Suzumori (10) Patent No.: US 9,744,996 B2
(45) Date of Patent: Aug. 29, 2017

(54) VEHICLE FRONT STRUCTURE

(71) Applicant: TOYODA IRON WORKS CO., LTD., Toyota-shi, Aichi (JP)

(72) Inventor: Michio Suzumori, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 14/881,550

(22) Filed: Oct. 13, 2015

(65) Prior Publication Data

US 2016/0107696 A1 Apr. 21, 2016

(30) Foreign Application Priority Data

Oct. 17, 2014 (JP) ................... 2014-213230

(51) Int. Cl.
*B62D 25/08* (2006.01)
*B62D 21/15* (2006.01)

(52) U.S. Cl.
CPC ......... *B62D 21/152* (2013.01); *B62D 25/082* (2013.01); *B62D 25/088* (2013.01)

(58) Field of Classification Search
CPC ...... B62D 21/15; B62D 21/152; B62D 25/08; B62D 25/082; B62D 25/088
USPC ............... 296/203.01, 203.02, 187.09, 187.1
See application file for complete search history.

(56) References Cited

U.S. PATENT DOCUMENTS

| 6,655,728 | B2 * | 12/2003 | Sano | B62D 21/152 296/187.09 |
| 8,967,701 | B2 * | 3/2015 | Barbat | B62D 21/152 296/187.1 |
| 9,145,172 | B2 * | 9/2015 | Bae | B62D 25/08 |
| 2013/0241233 | A1 * | 9/2013 | Ohnaka | B62D 21/152 296/187.1 |
| 2015/0360633 | A1 | 12/2015 | Nishida et al. | |

FOREIGN PATENT DOCUMENTS

| JP | 2009-171032 A | 7/2009 |
| JP | 2014-184857 A | 10/2014 |
| WO | 2014/115579 A1 | 7/2014 |

OTHER PUBLICATIONS

May 23, 2017 Office Action issued in Japanese Patent Application No. 2014-213230.

* cited by examiner

*Primary Examiner* — Dennis H Pedder
(74) *Attorney, Agent, or Firm* — Oliff PLC (57) ABSTRACT

A vehicle front structure including: a front side member in a side part of a vehicle that extends in a longitudinal direction; apron upper member above the front side member; and apron lower member that bridges between the upper member and a front end portion of the front side member. The lower member includes: a first end portion fixedly attached to the upper member and extending toward the front of the vehicle; an upper bent portion bent toward the bottom from the first end portion; an intermediate joint portion extending linearly from the upper bent portion toward the bottom; a lower bent portion bent toward the front from the intermediate joint portion, and the lower bent portion including a second end portion that is provided by a distal end portion of the lower bent portion, the second portion being fixedly attached to the front portion of the first side member.

7 Claims, 6 Drawing Sheets

FIG.3A
PLAN VIEW

FIG.3B
SIDE VIEW

FIG.4A
SIDE VIEW

FIG.4B
CONCEPTUAL DIAGRAM
OF DEFORMATION

SHAPE BEFORE
DEFORMATION

SHAPE AFTER
DEFORMATION

FIG.5A
PLAN VIEW

FIG.5B
CONCEPTUAL DIAGRAM
OF DEFORMATION

SHAPE BEFORE
DEFORMATION

SHAPE AFTER
DEFORMATION

FIG.6A
STRUCTURE OF THE INVENTION

FIG.6B
CONVENTIONAL STRUCTURE

VEHICLE FRONT STRUCTURE

INCORPORATION BY REFERENCE

The disclosure of Japanese Patent Application No. 2014-213230 filed on Oct. 17, 2014 including the specification, drawings and abstract is incorporated herein by reference in its entirety.

BACKGROUND OF THE INVENTION

1. Field of the Invention

The present invention relates to vehicle front structures in which an apron lower member is disposed so as to bridge between an apron upper member and a front side member, and more particularly to a technique of reducing collision impact or reducing injury values upon collision.

2. Description of the Related Art

Vehicle front structures are proposed which include (a) a front side member disposed in a side part of a vehicle so as to extend in the longitudinal direction of the vehicle, (b) an apron upper member disposed above the front side member, and (c) an apron lower member disposed so as to bridge between the apron upper member and the front end of the front side member. The structure described in Japanese Patent Application Publication No. 2009-171032 (JP 2009-171032 A) is an example of such a vehicle front structure, and the apron lower member is formed of a round pipe material.

In the conventional vehicle front structures, part of an impact load applied to the front side member upon collision is merely transmitted and dispersed from the apron lower member to the apron upper member, and reduction in collision impact or reduction in occupants' injury values upon collision cannot be sufficiently achieved, leaving room for improvement.

As used herein, the term "injury value" is a term defined by the Insurance Institute for Highway Safety (IIHS) etc., and is a value for quantitative evaluation of the level of injury to an occupant.

SUMMARY OF THE INVENTION

The present invention was developed in view of the above circumstances, and it is an object of the present invention to achieve reduction in impact or reduction in injury values in addition to dispersing a collision load in a vehicle front structure in which an apron lower member is disposed so as to bridge between an apron upper member and a front side member.

Means for Solving the Problems

To achieve the object, a first aspect of the present invention provides a vehicle front structure comprising: (a) a front side member disposed in a side part of a vehicle so as to extend in a longitudinal direction of the vehicle; (b) an apron upper member disposed above the front side member: and (c) an apron lower member formed of a round pipe material and disposed so as to bridge between the apron upper member and a front end portion of the front side member, (d) the apron lower member including: (d-1) a first end portion fixedly attached to the apron upper member and extending toward a front side of the vehicle as viewed from a lateral side of the vehicle; (d-2) an upper bent portion bent toward a bottom side of the vehicle from the first end portion as viewed from the lateral side; (d-3) an intermediate joint portion extending linearly from the upper bent portion toward the bottom side of the vehicle as viewed from the lateral side; and (d-4) a lower bent portion bent toward the front side of the vehicle from the intermediate joint portion as viewed from the lateral side, and (d-5) the lower bent portion including a second end portion that is provided by a distal end portion of the lower bent portion, the second end portion being fixedly attached to the front end portion of the front side member.

A second aspect of the present invention provides the vehicle front structure recited in the first aspect of the present invention, wherein the upper bent portion, the intermediate joint portion, and the lower bent portion, which includes the second end portion, cooperate to constitute a front part, and the front part is a low strength part having a lower flexural strength than the first end portion and the apron upper member.

As used herein, the term "flexural strength" refers to the maximum external bending force at which a material can withstand without failing.

A third aspect of the present invention provides the vehicle front structure recited in the second aspect of the present invention, wherein (a) the apron upper member is disposed above the front side member and outward of the front side member in a lateral direction of the vehicle, (b) the first end portion includes an inwardly bent portion that is bent inward in the lateral direction of the vehicle, such that the inwardly bent portion goes inward in the lateral direction as the inwardly bent portion goes toward the front side of the vehicle, as viewed in a plan view of the vehicle front structure, (c) the inwardly bent portion, which includes an end, the upper bent portion, the intermediate joint portion and the lower bent portion, which includes the second end portion, cooperate to constitute a linear-shaped part having a linear shape, the linear-shaped part extending obliquely inward in the lateral direction, such that the linear-shaped part goes inward in the lateral direction as the linear-shaped part goes toward the front side of the vehicle, as viewed in the plan view, and (d) the inwardly bent portion is a high strength part having a flexural strength equal to or higher than that of the apron upper member.

A fourth aspect of the present invention provides the vehicle front structure recited in the first aspect of the present invention, comprising (a) a joint member fixedly attached to an outer side surface of the front end portion of the front side member in the lateral direction of the vehicle, wherein (b) the joint member has an inclined surface that is inclined outward in the lateral direction of the vehicle, such that the inclined surface goes outward in the lateral direction as the inclined surface goes toward the front side of the vehicle, as viewed in the plan view, and (c) the second end portion of the lower bent portion is fixedly attached to the inclined surface of the joint member.

A fifth aspect of the present invention provides the vehicle front structure recited in the fourth aspect of the present invention, wherein a front end portion of the joint member is aligned with the front end portion of the front side member, and a crash box is attached to both the front end portion of the joint member and the front end portion of the front side member so as to bridge between the front end portion of the joint member and the front end portion of the front side member.

Effects of the Invention

In the vehicle front structure, the apron lower member disposed so as to extend between the apron upper member and the front side member is formed so that the first end portion extends toward the front of the vehicle, the upper bent portion is bent toward the bottom of the vehicle, the intermediate joint portion extends linearly toward the bottom of the vehicle, and the lower bent portion is bent toward the front of the vehicle, as viewed from the side. The apron lower member therefore generally has a crank shape. Accordingly, when subjected to an impact load from the front of the vehicle upon collision, the front side member is deformed toward the rear of the vehicle. At this time, the lower bent portion is shifted toward the rear of the vehicle accordingly, and the upper and lower bent portions are further bent. The apron lower member is thus deformed generally into a Z-shape as viewed from the side. As the apron lower member is thus deformed, impact energy is absorbed and impact is reduced, whereby occupants' injury values are reduced.

In the second aspect of the present invention, the upper bent portion, the intermediate joint portion, and the lower bent portion, which includes the second end portion, cooperate to constitute a front part, and the front part is a low strength part having a lower flexural strength than the first end portion and the apron upper member. This facilitates deformation of the front part upon collision. The apron lower member is therefore easily deformed into the Z-shape, whereby absorption of impact energy by the deformation is more stably achieved.

In the third aspect of the present invention, the apron upper member is disposed above the front side member and outward of the front side member in a lateral direction of the vehicle. The first end portion includes the inwardly bent portion, and the inwardly bent portion, the upper bent portion, the intermediate joint portion and the lower bent portion, which includes the second end portion, cooperate to constitute a linear-shaped part having a linear shape, the linear-shaped part extending obliquely inward in the lateral direction, such that the linear-shaped part goes inward in the lateral direction as the linear-shaped part goes toward the front side of the vehicle, and the inwardly bent portion is a high strength part. Therefore, as the front side member is deformed toward the rear of the vehicle upon collision, the lower bent portion is shifted toward the rear of the vehicle accordingly, whereby the relatively low strength front part is deformed so that the apron lower member has a Z-shape as viewed from the side. At this time, the front part is shifted outward in the lateral direction of the vehicle so as to extend along the high-strength inwardly bent portion as viewed in plan. The impact load thus escapes relatively outward in the lateral direction of the vehicle. This, together with the absorption of impact energy by deformation of the apron lower member, further reduces impact, whereby occupants' injury values are further reduced.

In the fourth aspect of the present invention, the joint member is fixedly attached to the outer side surface of the front end portion of the front side member, and the second end portion of the lower bent portion is fixedly attached to the inclined surface of the joint member. An angle at which the second end portion is attached to the inclined surface can therefore be made closer to 90°, which makes it easier to fix the second end portion to the inclined surface. For example, when the second end portion is inserted into a through hole formed in the inclined surface and is fixed by welding, required accuracy for the shape and dimensions of the second end portion is reduced. Productivity is thus improved.

In the fifth aspect of the present invention, the front end portion of the joint member is aligned with the front end portion of the front side member, and the crash box is attached to both the front end portion of the joint member and the front end portion of the front side member so as to bridge between the front end portion of the joint member and the front end portion of the front side member. This allows the wide crash box that is advantageous for small overlap collision to be used, and absorption of impact energy by the crash box can be appropriately achieved even in the event of small overlap collision. Specifically, the apron lower member coupled to the joint member suppresses inward deformation of the front side member in the lateral direction of the vehicle. This suppresses inward lateral buckling of the crash box in the lateral direction of the vehicle in the event of small overlap collision. Proper absorption of impact energy can thus be appropriately achieved by compressive deformation of the crash box in the axial direction. In this configuration, only the front end portion of the front side member is increased in width by the joint member. This suppresses an increase in weight and is advantageous in terms of cost, as compared to the case where the lateral dimension of the entire front side member is increased in order to use the wide crash box.

DETAILED DESCRIPTION OF EMBODIMENTS

The present invention is applicable to vehicle front structures for right and left front parts of vehicles. The present invention is desirably applied to both the right and left front parts of the vehicles, but may be applied to only one of the right and left front parts of the vehicles. For example, the front side member is a tubular member having a quadrilateral section etc., and is compressively deformed upon collision to absorb impact energy. However, the front side member is more rigid than the crash box disposed at the front end of the front side member, and is deformed after the crash box is crushed. For example, the apron upper member extends from the lower end of a front pillar toward the front of the vehicle. The apron upper member and the front side member are coupled as necessary by a suspension tower that supports the upper end of a suspension device, etc.

In the second aspect of the present invention, the upper bent portion, the intermediate joint portion, and the lower bent portion, which includes the second end portion, cooperate to constitute a front part, and the front part is a low strength part having a lower flexural strength than the first end portion and the apron upper member This low strength part is intended to facilitate deformation of the apron lower member into the Z-shape upon collision as viewed from the side. For example, the first end portion may be made to have high strength by quenching so that the front part serves as a relatively low strength part. The upper bent portion and the lower bent portion are easily flexurally deformed due to their shapes. Accordingly, when carrying out the first aspect of the present invention, the front part and the first end portion may have substantially the same flexural strength, and for example, the upper bent portion or the lower bent portion may be made to have high strength by quenching etc. It is desirable to increase flexural strength by quenching, but the flexural strength may be changed by other methods such as changing the thickness of the pipe material, carburizing, and nitriding.

In the third aspect of the present invention, the apron upper member is disposed above the front side member and outward of the front side member in the lateral direction of the vehicle. However, when carrying out the first aspect of the present invention, the apron upper member may be disposed, for example, immediately above the front side member. In the third aspect of the present invention, the first end portion includes the inwardly bent portion. However, when carrying out the first aspect of the present invention, the inwardly bent portion may be omitted. The first end portion may be formed only by the inwardly bent portion, and only the inwardly bent portion may be provided between the apron upper member and the upper bent portion. Alternatively, a linear portion, a bent portion, etc. may be provided on one or both of the front and rear sides of the inwardly bent portion. Regarding the second end portion located on the opposite side of the apron lower member from the first end portion as well, the tip end of the lower bent portion may be directly fixed as the second end portion to the front side member. Alternatively, a linear portion, a bent portion, etc. may be provided between the lower bent portion and the second end portion. In the third aspect of the present invention, the inwardly bent portion, which includes an end, the upper bent portion, the intermediate joint portion and the lower bent portion, which includes the second end portion, cooperate to constitute a linear-shaped part having a linear shape, the linear-shaped part extending obliquely inward in the lateral direction, such that the linear-shaped part goes inward in the lateral direction as the linear-shaped part goes toward the front side of the vehicle, as viewed in the plan view. However, when carrying out the first aspect of the present invention, this part may be in various forms such as being curved as viewed in plan or including a bent portion in the linear shape.

In the fourth aspect of the present invention, the joint member is fixedly attached to the outer side surface of the front end portion of the front side member in the lateral direction of the vehicle. When carrying out the other aspects of the present invention, however, the joint member may be omitted, and the second end portion of the apron lower member may be directly fixed to the front side member, or the joint member may be fixedly attached to the upper surface of the front side member etc. In the fifth aspect of the present invention, the crash box is attached to both the front end portion of the joint member and the front end portion of the front side member so as to bridge between the front end portion of the joint member and the front end portion of the front side member. This allows a wide crash box to be used.

However, a crash box similar to conventional crash boxes may be attached only to the front end portion of the front side member. This crash box has a tubular shape having a quadrilateral or hexagonal section etc., and is compressively deformed in the axial direction to absorb impact energy. A bumper reinforcement etc. is attached to the front end of this crash box.

[Embodiment]

An embodiment of the present invention will be described in detail below with reference to the accompanying drawings.

Figure 1:
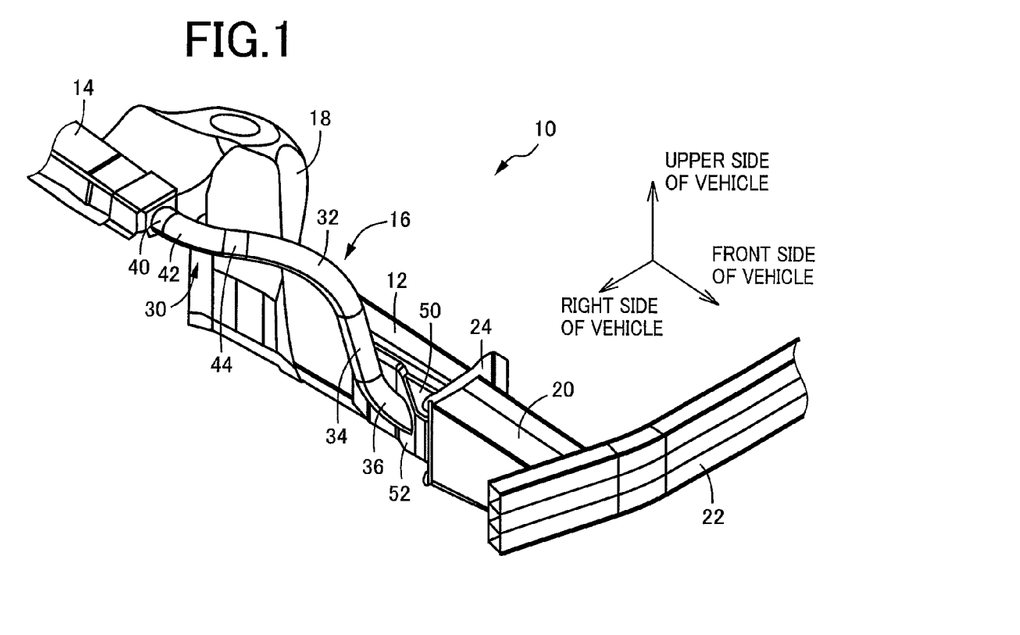
FIG. 1 is a schematic perspective view of a vehicle front structure for a right front part of a vehicle to which the present invention is applied.
Figure 2:
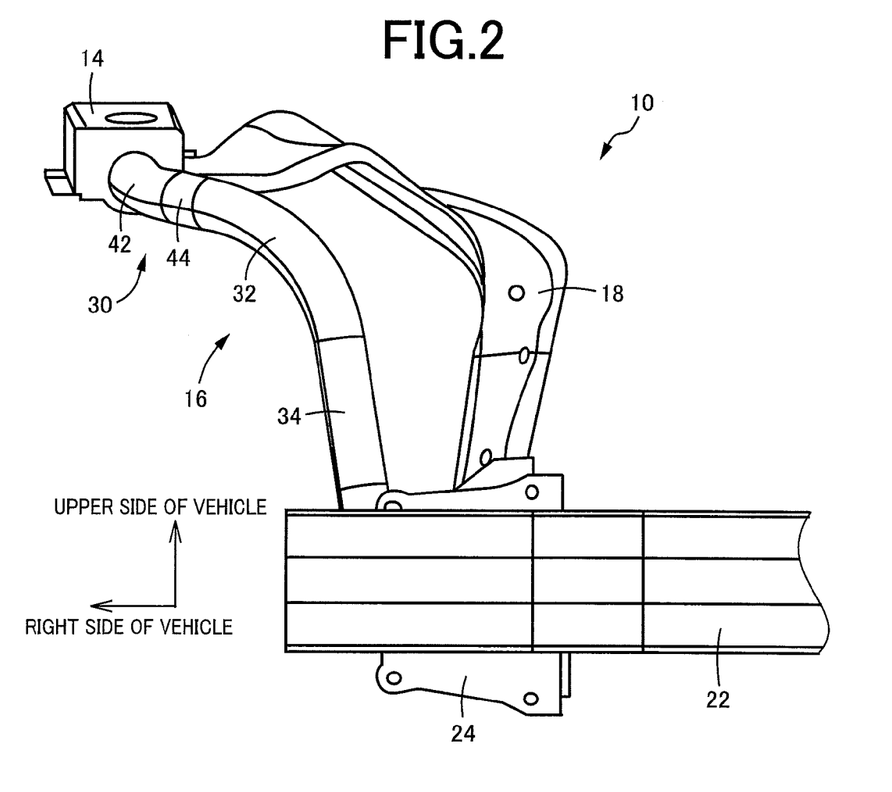
FIG. 2 is a front view of the vehicle front structure of FIG. 1 as viewed from the front of the vehicle.
Figure 3A:
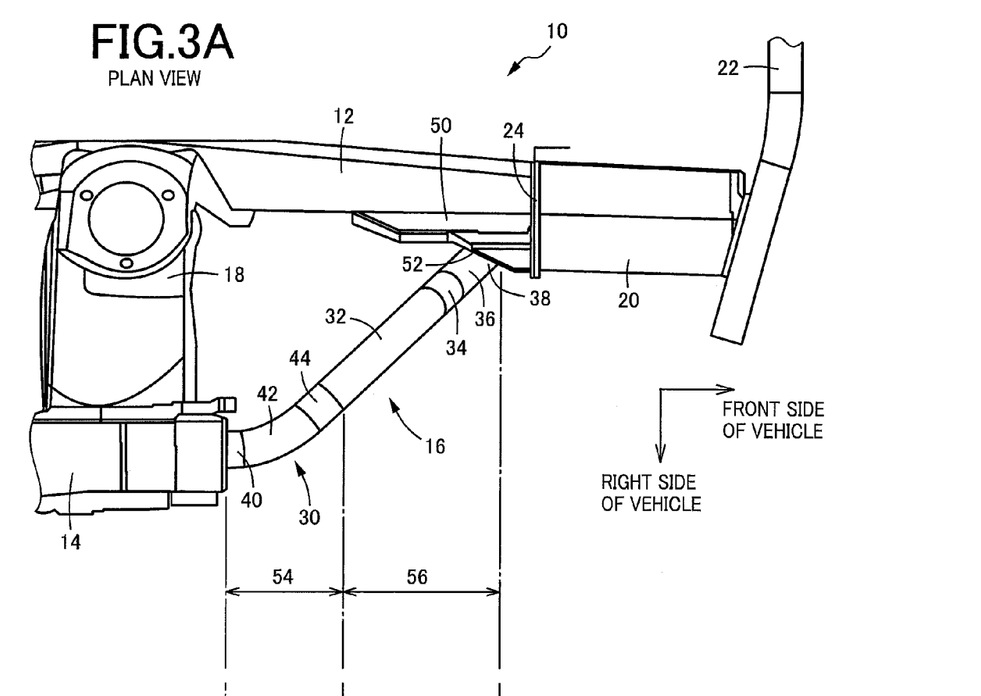
FIG. 3A is a plan view of the vehicle front structure of FIG. 1
Figure 3B:
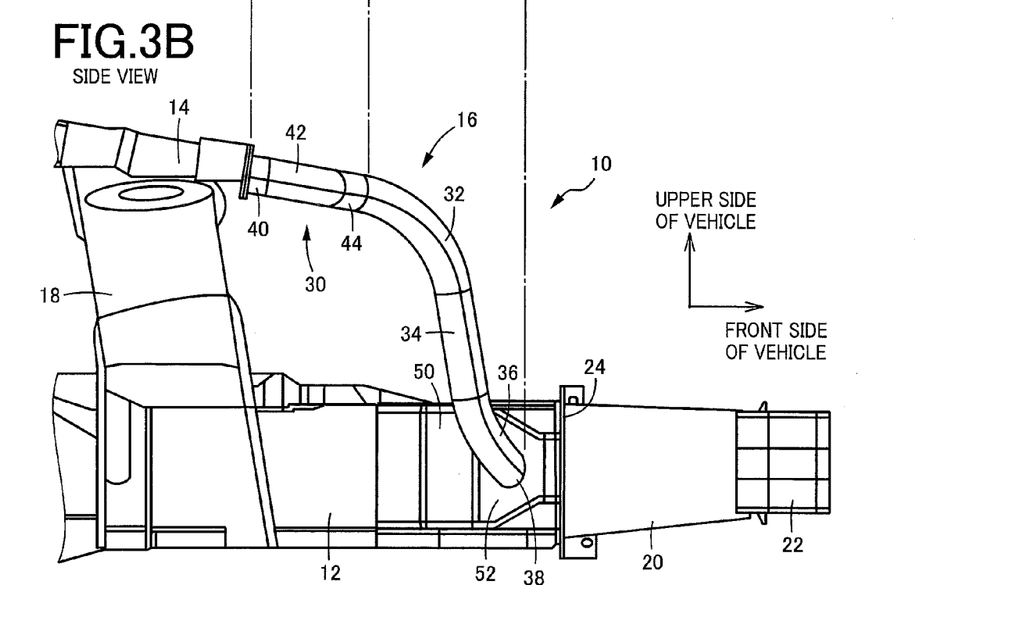
FIG. 3B is a side view of the vehicle front structure, which are shown associated with each other.

FIG. 1 is a schematic perspective view of a vehicle front structure 10 to which the present invention is applied. FIG. 2 is a front view of the vehicle front structure 10 as viewed from the front of a vehicle. FIG. 3A is a plan view of the vehicle front structure 10 and FIG. 3B is a side view of the vehicle front structure 10, which are shown associated with each other. This vehicle front structure 10 is used in the right front part of the vehicle, and a vehicle front structure for the left front part of the vehicle is configured to be a mirror image of the vehicle front structure 10. The vehicle front structure 10 includes a rectangular tubular front side member 12, an apron upper member 14, and an apron lower member 16. The front side member 12 is disposed in a right side part of the vehicle so as to extend in the longitudinal direction of the vehicle. The apron upper member 14 is disposed above the front side member 12 so as to be offset outward (to the right) in the lateral direction of the vehicle with respect to the front side member 12. The apron lower member 16 is disposed so as to bridge between the apron upper member 14 and the front end of the front side member 12.

The apron upper member 14 is disposed so as to extend from the lower end of a front pillar, not shown, toward the front of the vehicle. The apron upper member 14 and the front side member 12 are coupled by a suspension tower 18 in addition to by the apron lower member 16. The suspension tower 18 supports the upper end of a suspension device. A rectangular tubular crash box 20 is attached to the front end of the front side member 12, and the right end of a bumper reinforcement 22 is supported by the crash box 20. The front side member 12 and the crash box 20 have a shock absorbing function. Specifically, the front side member 12 and the crash box 20 are compressively deformed in the axial direction to absorb impact energy. However, the front side member 12 is more rigid than the crash box 20, and the front side member 12 is compressively deformed in the axial direction after the crash box 20 is completely crushed.

The apron lower member 16 is formed by bending a round pipe material into a predetermined shape and is disposed so as to extend between the front end of the apron upper member 14 and the front end of the front side member 12. That is, the apron lower member 16 includes a first end portion 30, an upper bent portion 32, an intermediate joint portion 34, and a lower bent portion 36. The first end portion 30 is firmly fixed to the front end of the apron upper member 14 by welding etc. The upper bent portion 32 is smoothly continuous with the first end portion 30, the intermediate joint portion 34 is smoothly continuous with the upper bent portion 32, and the lower bent portion 36 is smoothly continuous with the intermediate joint portion 34. The lower bent portion 36 includes a second end portion 38 that is provided by a distal end portion of the lower bent portion 36, the second end portion is fixedly attached to the front end portion of the first side member 12. The front end of the apron upper member 14 is located closer to the rear of the vehicle than the front end of the front side member 12 is. As viewed from the side shown in FIG. 3B, the first end portion 30 extends linearly toward the front of the vehicle, the upper bent portion 32 is bent toward the bottom of the vehicle, the intermediate joint portion 34 extends linearly toward the bottom of the vehicle, and the lower bent portion 36 is bent toward the front of the vehicle.

The first end portion 30 includes a first linear portion 40, an inwardly bent portion 42, and a second linear portion 44. The first linear portion 40 extends linearly from the apron upper member 14 toward the front of the vehicle. The inwardly bent portion 42 is smoothly continuous with the first linear portion 40, and is bent inward in the lateral direction of the vehicle, such that the inwardly bent portion 42 goes inward in the lateral direction as the inwardly bent portion 42 goes toward the front side of the vehicle, as viewed in the plan view shown in FIG. 3A. The second linear portion 44 is smoothly continuous with the inwardly bent portion 42, and linearly extends obliquely inward in the lateral direction of the vehicle closer to the front of the vehicle, as viewed in plan shown in FIG. 3A. The upper bent portion 32 is continuous with the second linear portion 44. The inwardly bent portion 42, which includes an end, the upper bent portion 32, the intermediate joint portion 34 and the lower bent portion 36, which includes the second end portion 38, cooperate to constitute a linear-shaped part having a linear shape, the linear-shaped part extending obliquely inward in the lateral direction, such that the linear-shaped part goes inward in the lateral direction as the linear-shaped part goes toward the front side of the vehicle, as viewed in the plan view shown in FIG. 3A. The first end portion 30 including the first linear portion 40, the inwardly bent portion 42, and the second linear portion 44, namely a rear part 54, has tensile strength as high as 1,400 MPa or more by quenching, and has flexural strength equal to or higher than that of the apron upper member 14. A front part 56 from the upper bent portion 32 to the second end portion 38 via the intermediate joint portion 34 and the lower bent portion 36 is not subjected to quenching, and is a brittle part (low strength part) having lower flexural strength than the rear part 54 and the apron upper member 14. In the present embodiment, the first end portion 30 and the rear part 54 are substantially the same part, which is a high strength part.

A joint member 50 is fixedly attached to the outer side surface of the front end of the front side member 12 in the lateral direction of the vehicle by welding etc. As viewed in the plan view shown in FIG. 3A, the joint member 50 has a tilted surface (inclined surface) 52 that is tilted (inclined) outward in the lateral direction of the vehicle such that the tilted surface 52 goes outward in the lateral direction as the tilted surface 52 goes toward the front side of the vehicle. The second end portion 38 of the apron lower member 16 is inserted into a through hole formed in the tilted surface 52, and is welded to the peripheral edge of the through hole. The joint member 50 is formed by bending a steel sheet. There is hollow space between the tilted surface 52 and the side surface of the front side member 12, so that the second end portion 38 can be inserted into the through hole of the tilted surface 52. The front end of the joint member 50 is aligned with the front end of the front side member 12, and an end plate 24 of the crash box 20 is attached to both the front end of the joint member 50 and the front end of the front side member 12 so as to bridge between the front end of the joint member 50 and the front end of the front side member 12. The wide crash box 20 that is advantageous for small overlap collision is thus used in the vehicle front structure 10.

Figure 4A:
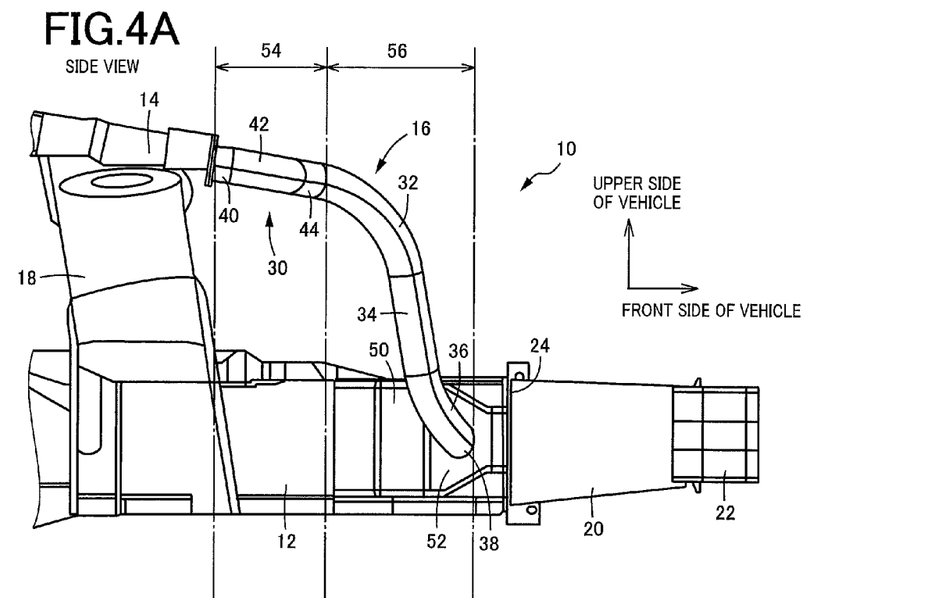
FIG. 4A is a side view of the vehicle front structure of FIG. 1
Figure 4B:
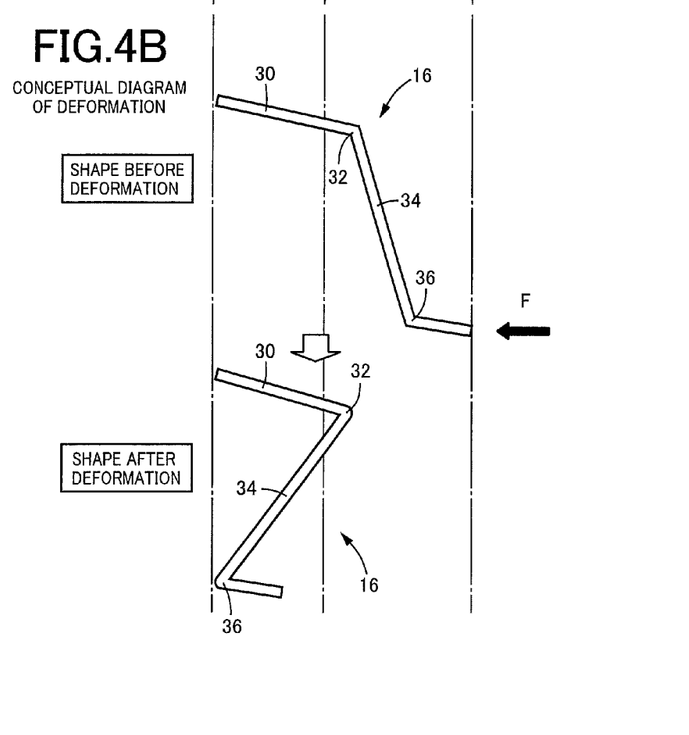
FIG. 4B is a schematic diagram conceptually showing the shapes of the apron lower member before and after deformation upon collision as viewed from the side, which are shown associated with each other.

In the vehicle front structure 10 of the present embodiment, the apron lower member 16 disposed so as to bridge between the apron upper member 14 and the front side member 12 is formed so that the first end portion 30 extends toward the front of the vehicle, the upper bent portion 32 is bent toward the bottom of the vehicle, the intermediate joint portion 34 extends linearly toward the bottom of the vehicle, and the lower bent portion 36 is bent toward the front of the vehicle, as viewed from the side shown in FIGS. 3B and 4A. The apron lower member 16 therefore generally has a crank shape (stretched-out Z shape), as can be seen from the shape before deformation in FIG. 4B. Accordingly, when subjected to an impact load F from the front of the vehicle upon collision, the front side member 12 is deformed toward the rear of the vehicle. At this time, the lower bent portion 36 is shifted toward the rear of the vehicle accordingly, and the upper and lower bent portions 32, 36 are further bent as shown by the shape after deformation in FIG. 4B. The apron lower member 16 is thus deformed generally into a Z-shape. As the apron lower member 16 is thus deformed, impact energy is absorbed and impact is reduced, whereby occupants' injury values are reduced. FIG. 4B is a schematic diagram conceptually showing the shapes of the apron lower member 16 before and after deformation upon collision as viewed from the side.

The upper bent portion 32, the intermediate joint portion 34, and the lower bent portion 36, which includes the second end portion 38, cooperate to constitute the front part 56, and the front part 56 is a low strength part having a lower flexural strength than the rear part 54 and the apron upper member 14. This facilitates deformation of the front part 56 upon collision. The apron lower member 16 is therefore easily deformed into the Z-shape, whereby absorption of impact energy by the deformation is more stably achieved.

Figure 5A:
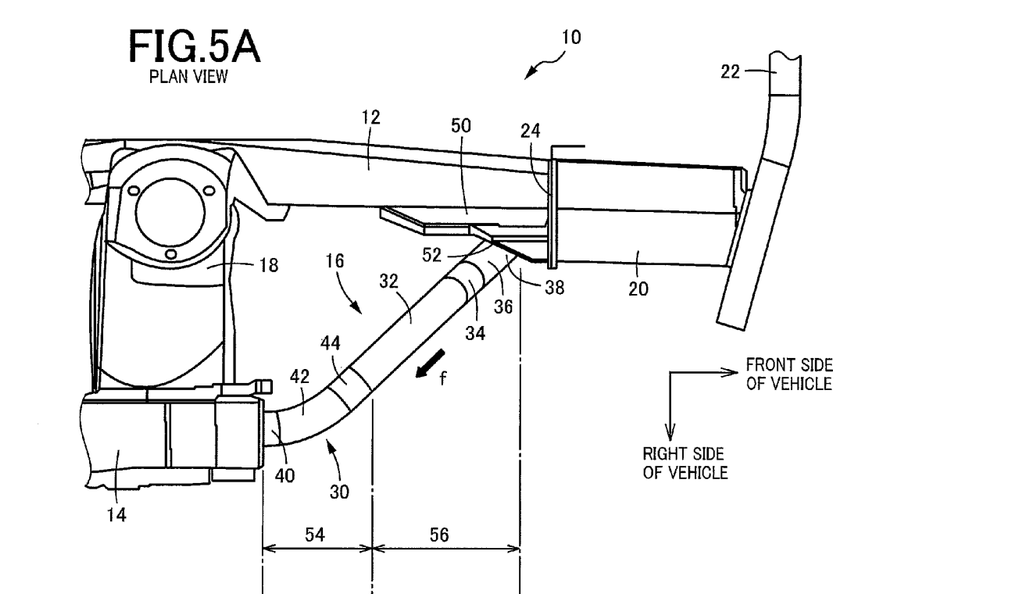
FIG. 5A is a plan view of the vehicle front structure of FIG. 1
Figure 5B:
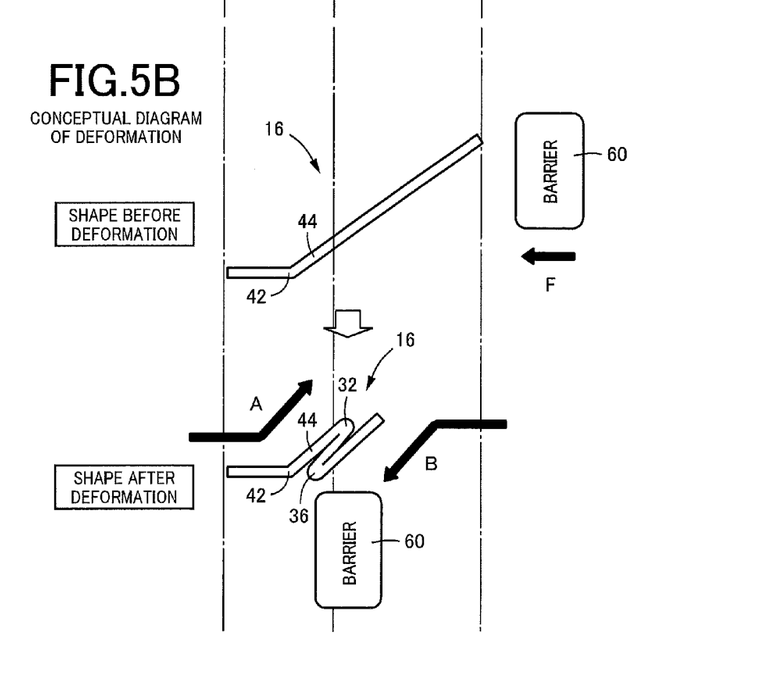
FIG. 5B is a schematic diagram conceptually showing the shapes of the apron lower member before and after deformation upon collision as viewed in plan, which are shown associated with each other.

The first end portion 30 includes the inwardly bent portion 42, and the inwardly bent portion 42, the upper bent portion 32, the intermediate joint portion 34 and the lower bent portion 36, which includes the second end portion 38, cooperate to constitute a linear-shaped part having a linear shape, the linear-shaped part extending obliquely inward in the lateral direction, such that the linear-shaped part goes inward in the lateral direction as the linear-shaped part goes toward the front side of the vehicle, as viewed in the plan view shown in FIGS. 3A and 5A, and the rear part 54 including the inwardly bent portion 42 is a high strength part. Therefore, as the front side member 12 is deformed toward the rear of the vehicle upon collision, the lower bent portion 36 is shifted toward the rear of the vehicle accordingly, whereby the relatively low strength front part 56 is deformed so that the apron lower member 16 has a Z-shape as viewed from the side, as shown in FIG. 4B. At this time, the front part 56 is shifted outward in the lateral direction of the vehicle so as to extend along the high-strength inwardly bent portion 42 and the high-strength second linear portion 44 as viewed in plan, as shown by the shape after deformation in FIG. 5B. The impact load F thus escapes relatively outward in the lateral direction of the vehicle, which causes the vehicle and a crash barrier 60 to be shifted relatively away from each other as shown by arrows A, B. This, together with the absorption of impact energy by deformation of the apron lower member 16, further reduces impact, whereby occupants' injury values are further reduced. FIG. 5B is a schematic diagram conceptually showing the shapes of the apron lower member 16 before and after deformation upon collision as viewed in plan.

The joint member 50 is fixedly attached to the outer side surface of the front end of the front side member 12, and the second end portion 38 of the apron lower member 16 is fixedly attached to the tilted surface 52 of the joint member 50. An angle at which the second end portion 38 is attached to the tilted surface 52 can therefore be made closer to 90° as viewed in plan, which makes it easier to fix the second end portion 38 to the tilted surface 52. Specifically, since the second end portion 38 is inserted into the through hole in the tilted surface 52 and is fixed by welding, required accuracy for the shape and dimensions of the second end portion 38 is reduced. For example, the second end portion 38 can be cut at right angles and fixed to the tilted surface 52. Productivity is thus improved.

The front end of the joint member 50 is aligned with the front end of the front side member 12, and the crash box 20 is attached to both the front end of the joint member 50 and the front end of the front side member 12 so as to bridge between the front end of the joint member 50 and the front end of the front side member 12. This allows the wide crash box 20 that is advantageous for small overlap collision to be used, and absorption of impact energy by the crash box 20 can be appropriately achieved even in the event of small overlap collision. In this configuration, only the front end of the front side member 12 is increased in width by the joint member 50. This suppresses an increase in weight and is advantageous in terms of cost, as compared to the case where the lateral dimension of the entire front side member 12 is increased in order to use the wide crash box 20.

Figure 6A:
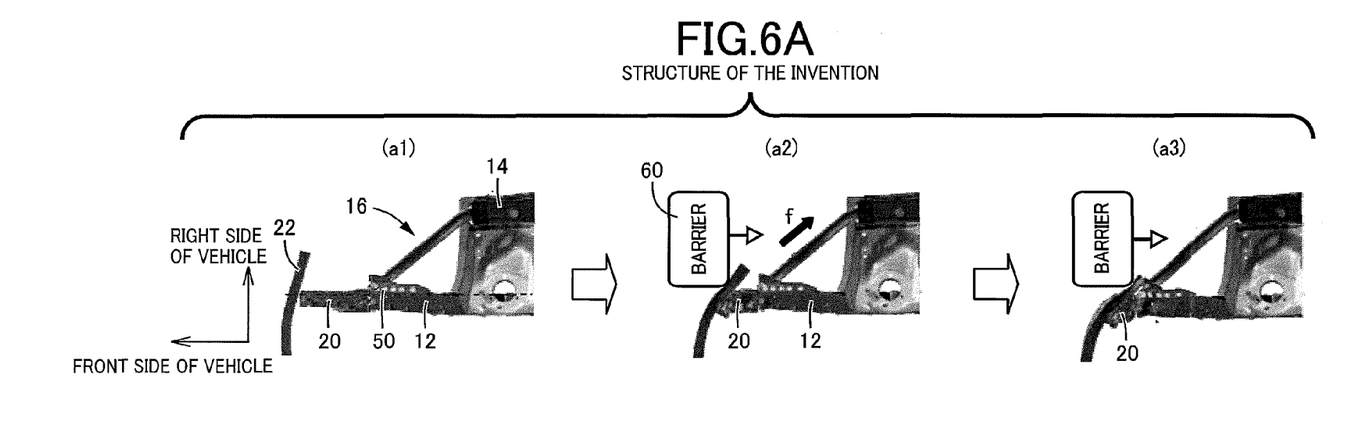
FIGS. 6A and 6B are plan views showing comparison of deformation in a small overlap collision test between the structure of the present invention and a conventional structure.

A tensile load f on the apron lower member 16 coupled to the joint member 50 (see FIG. 5A and (a2) of FIG. 6A) suppresses inward deformation of the front end of the front side member 12 in the lateral direction of the vehicle. This suppresses inward lateral buckling of the crash box 20 in the lateral direction of the vehicle in the event of small overlap collision. Proper absorption of impact energy can thus be appropriately achieved by compressive deformation of the crash box 20 in the axial direction.

Figure 6B:
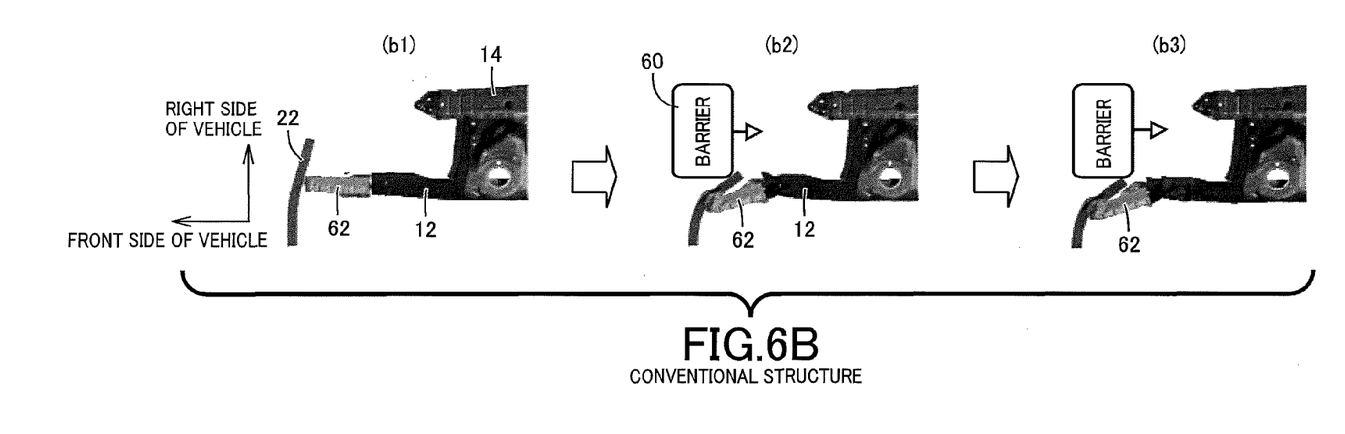

FIGS. 6A and 6B are plan views showing comparison of deformation in a small overlap collision test between the structure of the present invention and a conventional structure. In the structure of the present invention, the apron lower member 16 is coupled to the front end of the front side member 12 via the joint member 50. In the conventional structure, a crash box 62 is merely attached to the front end of the front side member 12. The small overlap collision test was performed such that the crash barrier 60 struck the bumper reinforcement 22 with overlapping only a small part of the end of the bumper reinforcement 22. The crash box 62 is a common crash box having a smaller lateral dimension than the crash box 20 and is attached only to the front end of the front side member 12. In the conventional structure shown in FIG. 6B, the front end of the front side member 12 is pressed and deformed inward in the lateral direction of the vehicle by the load from the crash barrier 60 at the stage of (b2) where the crash barrier 60 strikes the vehicle. The crash box 62 is thus tilted away from the crash barrier 60 accordingly. As shown in (b3), the crash box 62 substantially maintains its initial form despite the intrusion of the crash barrier 60 into the structure, and absorption of impact energy is therefore not achieved. In the structure of the present invention shown in FIG. 6A, however, the tensile load f on the apron lower member 16 suppresses deformation of the front end of the front side member 12 even at the stage of (a2) where the crash barrier 60 strikes the vehicle, preventing lateral buckling of the crash box 20. As shown in (a3), the crash box 20 is compressively deformed in the axial direction with intrusion of the crash barrier 60 into the structure, and absorption of impact energy is appropriately achieved.

The embodiment of the present invention is described above in detail with reference to the drawings. However, the embodiment is merely by way of example, and the present invention can be embodied in various modified or improved forms based on the knowledge of those skilled in the art.

NOMENCLATURE OF ELEMENTS

10: vehicle front structure 12: front side member 14: apron upper member 16: apron lower member 20, 62: crash box 30: first end portion 32: upper bent portion 34: intermediate joint portion 36: lower bent portion 38: second end portion 42: inwardly bent portion 50: joint member 52: tilted surface (inclined surface) 54: rear part (high strength part) 56: front part (brittle part, low strength part)

What is claimed is:

1. A vehicle front structure comprising:
   a front side member disposed in a side part of a vehicle so as to extend in a longitudinal direction of the vehicle;
   an apron upper member disposed above the front side member; and
   an apron lower member formed of a round pipe material and disposed so as to bridge between the apron upper member and a front end portion of the front side member,
   the apron lower member including:
      a first end portion fixedly attached to the apron upper member and extending toward a front side of the vehicle as viewed from a lateral side of the vehicle;
      an upper bent portion bent toward a bottom side of the vehicle from the first end portion as viewed from the lateral side;
      an intermediate joint portion extending straightly from the upper bent portion toward the bottom side of the vehicle as viewed from the lateral side; and
      a lower bent portion bent toward the front side of the vehicle from the intermediate joint portion as viewed from the lateral side, wherein
   the lower bent portion includes a second end portion that is provided by a distal end portion of the lower bent portion, the second end portion being fixedly attached to the front end portion of the front side member,
   the apron upper member is disposed above the front side member and outward of the front side member in a lateral direction of the vehicle,
   the first end portion includes an inwardly bent portion that is bent inward in the lateral direction of the vehicle, such that the inwardly bent portion goes inward in the lateral direction as the inwardly bent portion goes toward the front side of the vehicle, as viewed in a plan view of the vehicle front structure, and
   the inwardly bent portion, which includes an end toward the front side of the vehicle as viewed in the plan view; the upper bent portion; the intermediate joint portion; and the lower bent portion, which includes the second end portion, cooperate to constitute a straight-shaped part having a straight shape, the straight-shaped part extending obliquely inward in the lateral direction, such that the straight-shaped part goes inward in the lateral direction as the straight shaped part goes toward the front side of the vehicle, as viewed in the plan view.

2. The vehicle front structure according to claim 1, wherein the upper bent portion, the intermediate joint portion, and the lower bent portion, which includes the second end portion, cooperate to constitute a front part, and the front part is a low strength part having a lower flexural strength than the first end portion and the apron upper member.

3. The vehicle front structure according to claim 2, wherein the inwardly bent portion is a high strength part having a flexural strength equal to or higher than that of the apron upper member.

4. The vehicle front structure according to claim 1, further comprising:

a joint member fixedly attached to an outer side surface of the front end portion of the front side member in the lateral direction of the vehicle, wherein the joint member has an inclined surface that is inclined outward in the lateral direction of the vehicle, such that the inclined surface goes outward in the lateral direction as the inclined surface goes toward the front side of the vehicle, as viewed in the plan view, and the second end portion of the lower bent portion is fixedly attached to the inclined surface of the joint member.

5. The vehicle front structure according to claim 4, wherein a front end portion of the joint member is aligned with the front end portion of the front side member, and a crash box is attached to both the front end portion of the joint member and the front end portion of the front side member so as to bridge between the front end portion of the joint member and the front end portion of the front side member.

6. A vehicle front structure comprising:

a front side member disposed in a side part of a vehicle so as to extend in a longitudinal direction of the vehicle;

an apron upper member disposed above the front side member; and an apron lower member formed of a round pipe material and disposed so as to bridge between the apron upper member and a front end portion of the front side member; and a joint member fixedly attached to an outer side surface of the front end portion of the front side member in a lateral direction of the vehicle, the apron lower member including:

a first end portion fixedly attached to the apron upper member and extending toward a front side of the vehicle as viewed from a lateral side of the vehicle;

an upper bent portion bent toward a bottom side of the vehicle from the first end portion as viewed from the lateral side;

an intermediate joint portion extending straightly from the upper bent portion toward the bottom side of the vehicle as viewed from the lateral side; and a lower bent portion bent toward the front side of the vehicle from the intermediate joint portion as viewed from the lateral side, wherein the lower bent portion includes a second end portion that is provided by a distal end portion of the lower bent portion, the second end portion being fixedly attached to the front end portion of the front side member, the joint member has an inclined surface that is inclined outward in the lateral direction of the vehicle, such that the inclined surface goes outward in the lateral direction as the inclined surface goes toward the front side of the vehicle, as viewed in the plan view, and the second end portion of the lower bent portion is fixedly attached to the inclined surface of the joint member.

7. The vehicle front structure according to claim 6, wherein a front end portion of the joint member is aligned with the front end portion of the front side member, and a crash box is attached to both the front end portion of the joint member and the front end portion of the front side member so as to bridge between the front end portion of the joint member and the front end portion of the front side member.

* * * * *